United States Patent
Suh et al.

(10) Patent No.: US 12,556,252 B2
(45) Date of Patent: Feb. 17, 2026

(54) METHOD AND APPARATUS FOR EXTREMELY HIGH THROUGHPUT NULL DATA PACKET SUPPORT USING RANGING NULL DATA PACKET ANNOUNCEMENT

(71) Applicant: HUAWEI TECHNOLOGIES CO., LTD., Shenzhen (CN)

(72) Inventors: Jung Hoon Suh, Kanata (CA); Yan Xin, Kanata (CA); Osama Aboul-Magd, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 395 days.

(21) Appl. No.: 18/227,131

(22) Filed: Jul. 27, 2023

(65) Prior Publication Data
US 2024/0072863 A1    Feb. 29, 2024

Related U.S. Application Data

(60) Provisional application No. 63/400,074, filed on Aug. 23, 2022.

(51) Int. Cl.
*H04L 1/00* (2006.01)
*H04B 7/06* (2006.01)

(52) U.S. Cl.
CPC ......... *H04B 7/0626* (2013.01); *H04L 1/0069* (2013.01)

(58) Field of Classification Search
CPC ... H04B 7/0626; H04L 1/0069; H04L 1/0026; H04L 5/0057
See application file for complete search history.

(56) References Cited

U.S. PATENT DOCUMENTS

2022/0045725 A1\*  2/2022  Seok .................. H04L 5/00

OTHER PUBLICATIONS

Junghoon Suh, et. al., "Harmonization for TGbf NDPA", 802.11 TGbf 22/663r2, Mar. 31, 2022.
(Continued)

*Primary Examiner* — Said M Elnoubi (57) ABSTRACT

A format for a Null Data Packet Announcement (NDPA) frame for Wi-Fi sensing is provided. The frame format is based on the ranging NDPA frame format. The sensing frame can indicate channel state information measurement parameters, for a preamble punctured EHT NDP PPDU, in the Common Info field of the frame. When there is insufficient space in the Common Info field, the puncturing patterns can be indicated in each station (STA) field of the frame. Alternatively, the sensing frame can include an additional Common Info field that includes the information defining the puncturing patterns. Also provided is a method that indicates partial bandwidth (BW) feedback when the BW of each STA is smaller than the BW of the EHT NDP PPDU. A method that indicates the BW of the sensing NDPA frame is also provided, as is a method for setting the signal field in the EHT NDP PPDU for a number of long training field repetition.

27 Claims, 4 Drawing Sheets

(56) References Cited

OTHER PUBLICATIONS

IEEE P802.11be/D2.0. Draft Standard for Information technology. Telecommunications and information exchange between systems Local and metropolitan area networks—Specific requirements. Part 11: Wireless LAN Medium Access Control (MAC) and Physical Layer (PHY) Specifications. Amendment 8: Enhancements for extremely high throughput (EHT). Prepared by the 802.11 Working Group of the LAN/MAN Standards Committee of the IEEE Computer Society, 2022.

IEEE Standard for Information Technology Telecommunications and Information Exchange between Systems Local and Metropolitan Area Networks—Specific Requirements. Part 11: Wireless LAN Medium Access Control (MAC) and Physical Layer (PHY) Specifications. Amendment 4: Enhancements for Positioning. IEEE Computer Society. Developed by the LAN/MAN Standards Committee. IEEE Std 802.11az, 2022.

* cited by examiner

| B0-B10 | B11-B16 | B17-B19 | B20-B22 | B23-B25 | B26 | B27 | B28-B30 | B31 |
|---|---|---|---|---|---|---|---|---|
| AID11 | LTF offset | R2I N STS | R2I rep | I2R N STS | Sensing NDPA | Disambiguation | I2R rep | PPDU Format |
| 11 bits | 6 bits | 3 bits | 3 bits | 3 bits | 1 bit | 1 bit | 3 bits | 1 bit |

METHOD AND APPARATUS FOR EXTREMELY HIGH THROUGHPUT NULL DATA PACKET SUPPORT USING RANGING NULL DATA PACKET ANNOUNCEMENT

CROSS-REFERENCE TO RELATED APPLICATIONS

This application claims the benefit of and priority to U.S. provisional patent application no. 63/400,074 filed on Aug. 23, 2022, entitled "METHOD AND APPARATUS FOR EXTREMELY HIGH THROUGHPUT NULL DATA PACKET SUPPORT USING RANGING NULL DATA PACKET ANNOUNCEMENT" the entire contents of which are incorporated herein by reference.

FIELD OF THE INVENTION

The present invention pertains to Wi-Fi technology, in particular to Wi-Fi sensing.

BACKGROUND

Wi-Fi sensing technology is progressing and is looking to standardize communication parameters related to null data packet (NDP) physical layer protocol data units (PPDUs) and extremely high throughput (EHT)NDP PPDUs. At present, there is a push to have the format of sensing NDP PPDUs to be the same format as the NDP PHY PPDU and the EHT NDP PPDU.

Wi-Fi technology that meets the IEEE 802.11az standard allows Wi-Fi stations (STAs) to identify their position relative to different access points (APs). Wi-Fi technology being developed for WLAN sensing, i.e., Wi-Fi technology that can detect object motion, recognize gestures, and estimate physical parameters such as size, angle, distance, etc. is expected to fall under the under the IEEE standard being developed by IEEE 802.11 Task Group BF. Frame formats defined under the IEEE 802.11az are expected to be used for sensing application. Namely, the ranging NDP PPDUs and the EHT NDP PPDUs are expected to be used as sensing NDP PPDUs.

In current Wi-Fi systems, ranging NDP PPDUs support a bandwidth (BW) of up to 160 MHz and are basically a high efficiency (HE) NDP PPDU but do not allow any preamble puncturing (sub-channel puncturing) or partial bandwidth (PBW) feedback. PBW can be used by receivers that do not have the capability of operating at the full BW of the NDP or NDP announcement (NDPA) transmissions. Both NDP and NDPA should have the same BW. However, a ranging NDP includes a responder-to-initiator (R2I) NDP that can be sent from a non-access AP station (STA) to other STAs including the AP. And the ranging NDP can support the repetition of the long training field (LTF).

The EHT NDP PPDUs support a BW of up to 320 MHz, which is double the value of the BW supported by ranging NDP PPDUs. Additionally, EHT NDP PPDUs support preamble puncturing and partial BW. EHT NDPs may implicitly support the LTF repetition once, using the number of LTFs parameter in the common field of the EHT-Signal field (SIG), that is, for a number of Spatial Stream of 4, the number of LTFs can be set to 4 or 8.

However, the sensing NDPA format is likely to be that of the ranging NDPA, which may not have enough space to indicate all the necessary parameters to support both EHT NDP PPDUs and ranging NDP PPDUs. This lack of space could lead to additional issues.

Therefore, improvements in Wi-Fi sensing are desirable.

This background information is provided to reveal information believed by the applicant to be of possible relevance to the present invention. No admission is necessarily intended, nor should be construed, that any of the preceding information constitutes prior art against the present invention.

SUMMARY

In a first aspect, the present disclosure proved a that comprises sending, by an initiator Wi-Fi device to one or more responder Wi-Fi devices (RWFDs), a request for channel state information (CSI). The request comprises a sensing null data packet announcement (NDPA) frame, which has one or more RWFD fields each associated with a respective RWFD of the one or more RWFDs. The request also has a first common information field (CIF) comprising first information segments defining first information common to the one or more RWFDs, the first CIF having an AID11 value of 2045, the first CIF having four octets. Additionally, the request also has a second CIF comprising second information segments defining second information common to the one or more RWFDs, the second information segments having 8 bits to define a sub-channel puncturing pattern. The method also comprises receiving, by the initiator Wi-Fi device, at least one response to the request for CSI.

In embodiments of the first aspect, the method may also comprise by the initiator Wi-Fi device, determining that partial bandwidth feedback from the one or more RWFDs is allowed, and defining, in the second CIF, with the 8 bits, the sub-channel puncturing pattern.

In embodiments of the first aspect, the method may also comprise, by the initiator Wi-Fi device, determining that partial bandwidth feedback is disallowed; and defining, in the second CIF, the sub-channel puncture pattern using at most 5 bits of the 8 bits.

Each of the one or more RWFD field may have a respective AID value comprised between 1 and 2007. The second CIF may have an AID11 value comprised between 2008 and 2042. The second CID may have four octets. The initiator Wi-Fi device may be a Wi-Fi access point. The one or more RWFDs may be Wi-Fi stations.

In a second aspect, there is provided a method that comprises sending, by an initiator Wi-Fi device to one or more responder Wi-Fi devices (RWFDs), a request for channel state information, the request comprising a sensing null data packet announcement (NDPA) frame. The sensing NDPA frame has one or more RWFD fields each associated with a respective RWFD of the one or more RWFDs, each of the one or more RWFDs comprising a respective 6-bit segment defining a sub-channel puncturing pattern. The sensing NDPA frame also has a common information field (CIF) comprising information segments defining information common to the one or more RWFDs. The CIF has a respective AID11 value of 2045.

In embodiments of the second aspect, the method may further comprise, by the initiator Wi-Fi device, forming the sensing NDPA frame.

In embodiments of the second aspect, the initiator Wi-Fi device may determine that partial bandwidth feedback is allowed and, for a sub-channel puncturing pattern that requires 6 bits or less, may indicate the sub-channel puncturing pattern in the 6-bit segment of each RFWD field of the one or more RWFD fields.

In embodiments of the second aspect, the method may further comprise, by the initiator Wi-Fi device, determining that partial bandwidth feedback is disallowed; and when the sub-channel puncturing patterns requires at most 5 bits, indicating the sub-channel puncturing patterns in the 6-bit segment of each RFWF field of the one or more RWFD fields.

In embodiments of the second aspect, each RWFD field of the one or more RWFD fields may further comprise a 1-bit field, B26, to indicate the NDPA frame is a sensing NDPA frame.

In embodiments of the second aspect, each RWFD field of the one or more RWFD fields may further comprise a 1-bit field, B31, to indicate a type of NDP PPDU to follow. The type of the NDP PPDU to follow may be a EHT NDP PPDU type or a ranging NDP type.

In embodiments of the second aspect, the NDPA frame may indicate that partial bandwidth is allowed or disallowed; and each RWFD field of the one or more RWFD fields may comprises an 11-bit field, B0 to B10, defining a respective AID11 value comprised between 1 and 2007; and a 6-bit field, B11 to B16, associated to a sub-channel puncturing pattern.

In embodiments of the second aspect, each RWFD of the one or more RWFDs may have a respective operating bandwidth and the method may further comprise: determining a lowest operating bandwidth of the respective bandwidths of the one or more RWFDs; and setting a bandwidth of the sensing NDPA frame to the lowest operating bandwidth of the respective bandwidths of the one or more RWFDs.

In embodiments of the second aspect, each RWFD of the one or more RWFDs may have a respective operating bandwidth and the method may further comprise: determining a lowest operating bandwidth of the respective bandwidths of the one or more RWFDs; and setting a bandwidth of the sensing NDPA frame to the lowest operating bandwidth of the respective bandwidths of the one or more RWFDs.

In a third aspect, there is provided a method that comprises sending, by an initiator Wi-Fi device to one or more responder Wi-Fi devices (RWFDs), a request for channel state information. The request comprises a sensing null data packet announcement (NDPA) frame.

The sensing NDPA frame has one or more RWFD fields each associated with a respective RWFD of the one or more RWFDs; a first common information field (CIF) comprising first information segments defining information common to the one or more RWFDs, the first CIF having a respective AID11 value of 2045, the CIF having four octets; and a second CIF comprising second information segments defining a bandwidth of the sensing NDPA frame.

In a fourth aspect, there is provided a method that comprises sending, by an initiator Wi-Fi device to one or more responder Wi-Fi devices (RWFDs), a request for channel state information. The request comprises a sensing null data packet announcement (NDPA) frame. The sensing NDPA frame has one or more RWFD fields each associated with a respective RWFD of the one or more RWFDs. Each RWFD field of the one or more RWFD fields has a one-bit field, B31, indicating a type of NDP PPDU to follow. The NDP PPDU type to follow is a ranging NDP PPDU type or an EHT NDP PPDU type. The method further comprises, when the type of NDP PPDU to follow is of the EHT NDP PPDU type, indicating, at B20 to B25, a number of repetitions of a long training field.

In embodiments of the fourth aspect, the number of repetitions of the long training field may be, at most, eight repetitions.

In a fifth aspect, there is provided a method that comprises receiving, by an individual responder Wi-Fi device (RWFD), the individual RWFW being one a plurality of RWFDs, from an initiator Wi-Fi device, a request for channel state information. The request comprises a sensing null data packet announcement (NDPA) frame. The sensing NDPA frame has one or more RWFD fields each associated with a respective RWFD of the plurality of RWFDs. The sensing NDPA frame also has a first common information field (CIF) comprising first information segments defining first information common to the plurality of RWFDs, the first CIF having an AID11 value of 2045, the first CIF having four octets. The sensing NDPA frame additionally has a second CIF comprising second information segments defining second information common to the one or more RWFDs. The second information segments have 8 bits to define a sub-channel puncturing pattern. The method further comprises sending, by the individual RWFD, to the initiator Wi-Fi device, a response to the request.

In a sixth aspect, there is provided a method that comprises sending, by an initiator Wi-Fi device to one or more responder Wi-Fi devices (RWFDs), a request for channel state information (CSI). The request comprises a sensing null data packet announcement (NDPA) frame. The sensing NDPA frame has one or more RWFD fields each associated with a respective RWFD of the one or more RWFDs. Each RWFD field of the one or more RWFD fields comprises: an 11-bit field, B0 to B10, defining a respective AID11 value comprised between 1 and 2007; a first 3-bit field, B20 to B22; and a second 3-bit field, B28 to B30, the first 3-bit field and the second 3-bit field being set to indicate, a number of repetitions allowed for a long training field (LTF) of an EHT NDP PPDU to follow; a 6-bit field, B11 to B16, associated to a sub-channel puncturing pattern. Each RWFD field of the one or more RWFD fields also comprises a first common information field (CIF) comprising first information fields defining information common to the one or more RFWDs, the first CIF having an AID11 value of 2045.

In a seventh aspect there is provided a method of indicating a channel state information (CSI) measurement in a Sensing NDPA frame for a preamble punctured EHT NDP PPDU. The sensing NDPA frame has a ranging NDPA format. The method comprises including, in the Sensing NDPA frame, a first special station (STA) Info field having an association identification (AID) of 2045. The method also comprises including, in the Sensing NDPA frame, a second special STA Info field having an AID of between 2008 and 2042, the second special STA Info field having 32 bits in length. When partial bandwidth PBW is allowed, the method also includes indicating the possible puncturing patterns using the at least eight bits of the STA Info field. And, when PBW is not allowed, the method includes indicating the possible puncturing patterns using at most five bits of the second special STA Info field.

In an eight aspect there is provided a method of indicating a channel state information (CSI) measurement in a Sensing Null Data Packet Announcement (NDPA) frame for a preamble punctured EHT NDP PPDU. The sensing NDPA frame has a ranging NDPA format. The method comprises including, in the Sensing NDPA frame, a first special station (STA) field having an association identification (AID) of 2045. The method further comprises including, in the Sensing NDPA frame, N STA info fields, N being an integer corresponding to a number of STAs. When PBW is not allowed, the method comprises including, in each of the N STA info fields, at B11 to B16, the possible puncture patterns. When partial bandwidth PBW is allowed and when the puncture pattern requires six bits or less, the method comprises indicating, in each of the N STA info fields, the puncture pattern at B11 to B16.

In embodiments of the eight aspect, each of the N STA info fields may a Long Training Field (LTF) Offset sub-field at B11 to B16 and the method further may further comprise re-purposing the LTF Offset sub-field to indicate the possible puncturing patterns.

In a ninth aspect, there is provided a method of indicating a channel state information (CSI) measurement in a Sensing Null Data Packet Announcement (NDPA) frame for a preamble punctured non-high throughput (HT) PPDU. The sensing NDPA frame has a ranging NDPA format. The method comprises including, in the Sensing NDPA frame, a first special station (STA) Info field having an association identification (AID) of 2045. The method also comprises including, in the Sensing NDPA frame, a second special STA Info field having an AID of between 2008 and 2042, the second special STA Info field having 32 bits in length.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features may be identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

Figure 1:
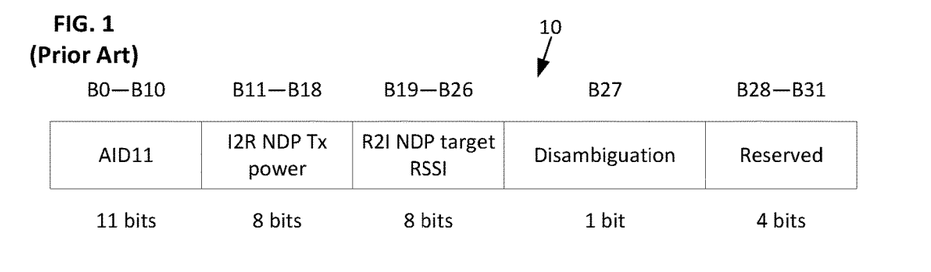
FIG. 1 shows a prior art special STA info field format for a Ranging NDPA frame when the AID11 subfield is 2045.
Figure 2:
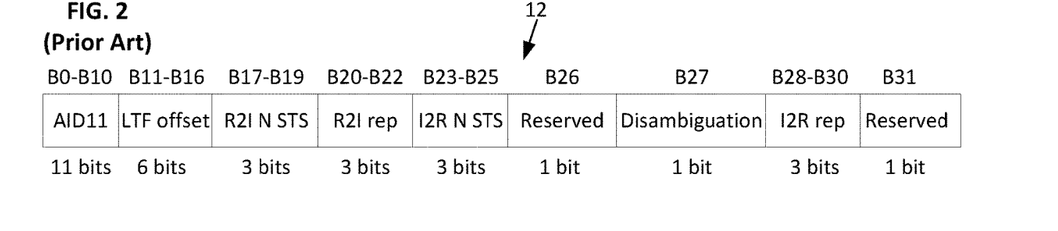
FIG. 2 shows a prior art STA info field in the Ranging NDPA.

FIG. 1 shows a common (special) STA Info Field 10 formatted for a Ranging NDPA frame when the association identifier 11 (AID11) subfield is 2045. The info in the subfields of the common Info Field 10 is common to all the STAs of the Wi-Fi system to which the Ranging NDPA frame may be transmitted. FIG. 2 shows an example of a STA Info Field 12 present in the Ranging NDPA frame.

Figure 3:
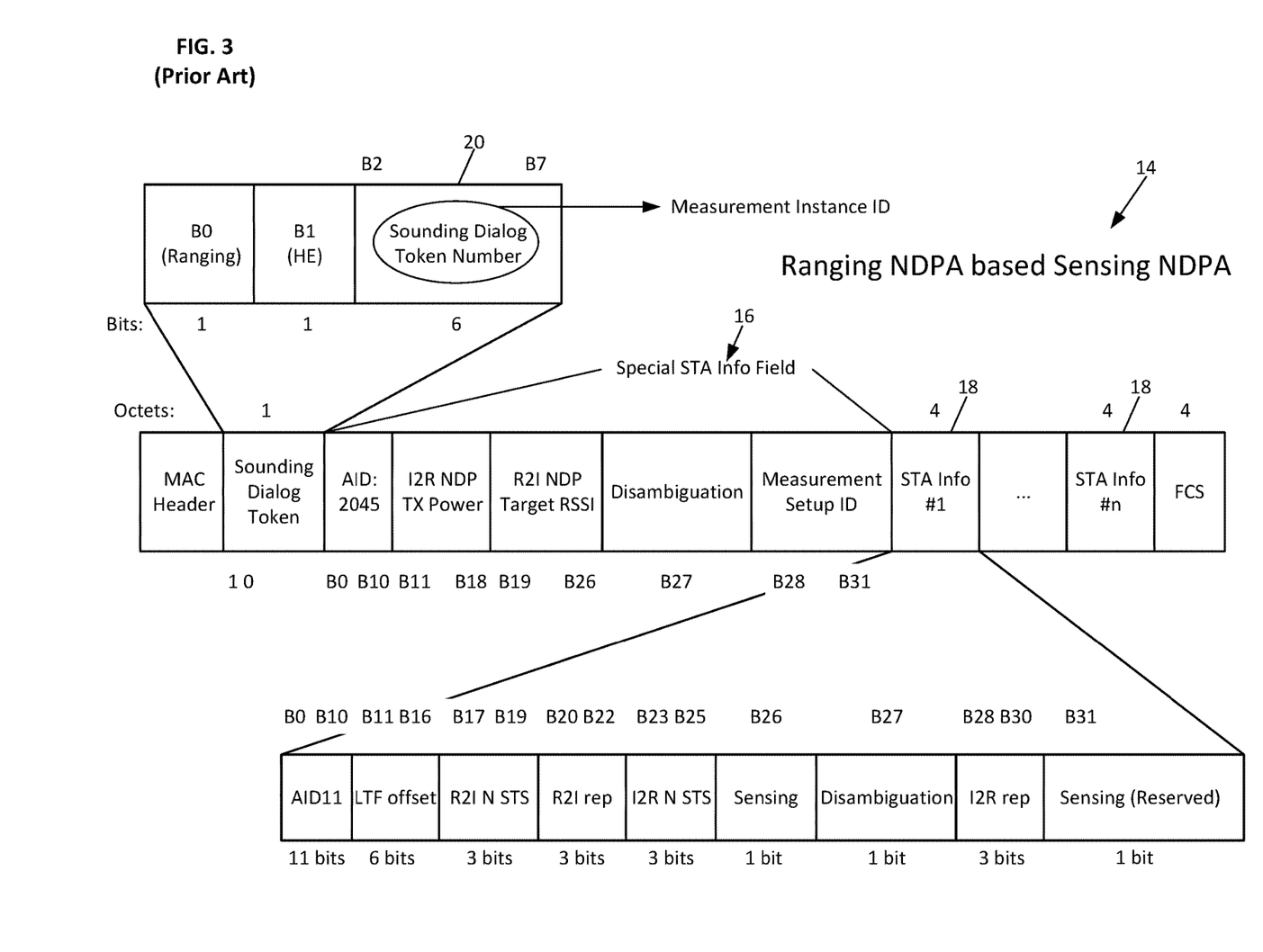
FIG. 3 shows a previously proposed embodiment of a Sensing NDPA based on a Ranging NDPA.

FIG. 3 shows a previously proposed embodiment of a Sensing NDPA frame 14 whose format is based on a Ranging NDPA frame format. Also shown in FIG. 3, is a Common Info Field 16 beginning with an AID11 that has a value of 2045 and extending from B0 to B31. The Common Info Field 16 followed by 'n' STA Info Fields 18 ('n' is the number of STAs). In the embodiment of the Sensing NDPA frame 14 of FIG. 3, B26 and/or B31 of each STA Info Field 18 may be used to indicate a Sensing NDPA instead of a Ranging NDPA. In this embodiment, a Sensing NDPA Measurement Instance ID may be indicated using the 6-bit Sounding Dialog Token Number, with the first two bits in the Sounding Dialog Token Field 20 being set to 1 and 0, as would be in a Ranging NDPA frame. Setting these bits to 1 and 0 distinguishes from VHT/HE/EHT NDPAs.

There is one NDPA frame format but there are two NDP PPDU frame formats that should be supported. The Sensing NDPA frame format shown in FIG. 3 does not address the following questions:

How to indicate the CSI Measurement in the Sensing NDPA for the Preamble Punctured EHT NDP PPDU?

How to indicate Partial BW Feedback in a Sensing NDPA when the operation BW of each responder is smaller than the BW of EHT NDP PPDU?

Does the BW of the NDPA frame need to be explicitly indicated and if so, where?

How is the SIG field to be set in the EHT NDP PPDU for any number of LTF repetitions?

Indicating CSI measurement in Sensing NDPA for Preamble Punctured EHT NDP PPDU:

The present disclosure discloses embodiments that may indicate CSI measurement parameters in a Sensing NDPA for a Preamble Punctured EHT NDP PPDU. The indication of Preamble Puncturing may be provided in two different ways, depending on whether Partial BW Feedback is allowed or not. In the context of the present disclosure, preamble puncturing refers to a Wi-Fi device's ability to transmit a "punctured" Wi-Fi spectrum channel where some parts of the channel are carved out as they are used by legacy systems such as, for example, weather channel systems.

Partial BW feedback and preamble puncturing are related in the sense that when partial BW is allowed, there is preamble puncturing.

When Partial BW feedback is allowed (or present), then, at least 8 bits are necessary to indicate the preamble puncturing. For example, when 20 MHz is the feedback (FB) resolution for an NDPA/NDP BW of 160 MHz, then the FB resolution allows 8 (160/20) 20 MHz sub-channels to be excluded (punctured) from the 160 MHz channel. As another example, when 40 MHz is the FB resolution when the NDPA/NDP BW is 320 MHz, then the FB resolution also allows 8 (320/40) 40 MHz sub-channels to be excluded (punctured) form the 320 MHz channel. For these examples, the same table as Table 9-42c in 802.11 P802.11be_D2.0, 23 May 2022, IEEE 802.11 Standards, page 140, may be applied, except for the first bit (bit 9) implying the FB resolution. That is, when the partial BW (preamble puncturing pattern) is to be indicated in the sensing NDPA frame, only 8 bits are required. The BW itself may be indicated in the Service field of non-HT PPDU, which can be used for the NDPA frame, and the BW may also be indicated in the SIG field of a subsequent NDP frame.

When partial BW FB is not allowed, then 5 bits are sufficient to indicate the preamble puncturing patterns. The preamble puncturing patterns in the Sensing NDPA may preferably be aligned with the preamble puncturing patterns in the EHT NDP PPDU, which are also aligned with the static puncturing patterns exchanged during the association between an AP and a STA (or more than one STA). At Table 36-30 in 802.11 P802.11be_D2.0, 23 May 2022, IEEE 802.11 Standards, the punctured channel information for the non-OFDMA (Orthogonal Frequency-Division Multiple Access) scenario may be used. As shown in the Table 36-30, there are 25 possible field values indicating possible puncturing patterns. Thus, 5 bits are sufficient to indicate each of the possible field values. Only 25 of the 32 ($2^5$) available values provided by the 5 bits are needed.

Dynamic puncturing patterns are any puncturing in addition to the static puncturing patterns and cannot be indicated in any frame that solicits a response. As sounding usually requires a response, dynamic puncturing is not appropriate for the sounding. Therefore, dynamic puncturing patterns may be disallowed in the sensing sounding.

Embodiments of the present disclosure may also resolve where to indicate these preamble puncturing patterns in a Sensing NDPA frame. In some embodiments of the present disclosure, the preamble puncturing patterns may be common to all the STAs listed in the STA Info fields of a Sensing NDPA frame, that is, the puncturing patterns may be indicated in a Common Info Field (also referred to as a special STA Info Field) that includes info common to all the STAs or, the puncturing patterns may be indicated in each STA Info field when there is not enough space to indicate it in the Common Info field.

Embodiment Using a Common Info Field

Figure 4:
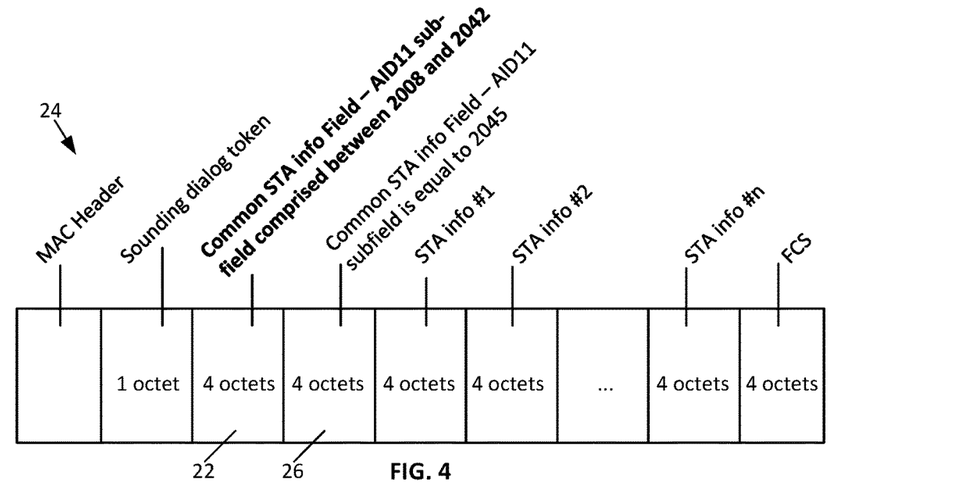
FIG. 4 shows an embodiment where an additional Common Info Field, with an AID comprised between 2008 and 2042, is included in a sensing NDPA frame in accordance with the present disclosure.

In an embodiment of the present disclosure, an AID11 subfield is provided for a second Common Info Field in addition to the existing Common Info Field associated to AID11 subfield 2045. AID11 subfield 2008 to AID11 subfield 2042 are currently reserved in 802.11 P802.11be_D2.0, 23 May 2022, IEEE 802.11 Standards. In some embodiments of the present disclosure, the sensing NDPA frame may use one of the AID11 subfields comprised between 2008 and 2042 for second Common Info Field. This new Common AID11 subfield may be any available AID11 subfield in 802.11 P802.11be_D2.0, 23 May 2022, IEEE 802.11 Standards that is not occupied for some other purpose. In some embodiments, the second Common Filed may include information that defines the preamble puncturing patterns. In some embodiments, the length of the second Common Info Field may be 4 bytes. FIG. 4 shows an embodiment where an additional Common Info Field 22, with an AID11 subfield comprised between 2008 and 2042, is included in a sensing NDPA frame 24 in accordance with the present disclosure. In some embodiments, the position of the additional Common Info Field 22 may be swapped with the position existing Common Info Field 26 shown in FIG. 4.

Embodiment Using a Subfield in a STA Info Field

Figure 5:
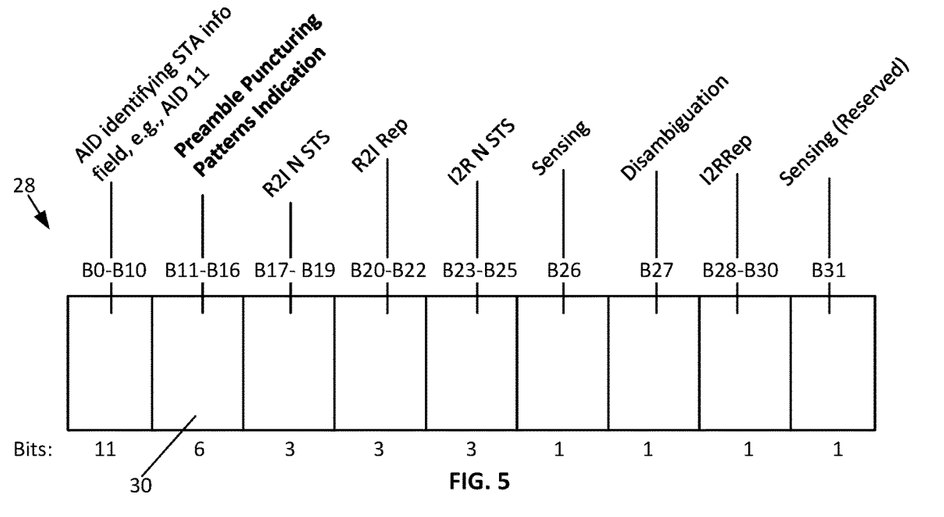
FIG. 5 shows an embodiment where a 6-bit Preamble Puncturing Pattern Indication is included in each STA Info Field of a Sensing NDPA frame in accordance with the present disclosure.

Bits B11 to B16 of each STA Info field in the Ranging NDPA are used for the LTF offset, which is an LTF Security relevant parameter. LTF Security is not needed in the Sensing NDPA. Thus, in some embodiments of the present disclosure, the LTF Offset subfield, B11 to B16, may be re-purposed to indicate Preamble Puncturing Patterns. In cases where fewer than 6 bits are required for the Preamble Puncturing Patterns, then, the remaining bits not used to identify a Preamble Puncturing Pattern may be set to Reserved in the STA Info field. FIG. 5 shows an embodiment, in accordance with the present disclosure, of a STA info field 28 that has a 6-bit Preamble Puncturing Pattern Indication field 30 at B11 to B16. In accordance with the present embodiment, each STA Info Field of a Sensing NDPA frame may include the same 6-bit Preamble Puncturing Pattern Indication at B11 to B16.

Indicating Partial BW Feedback in a Sensing NDPA when the operation BW of each responder is smaller than the BW of an EHT NDP PPDU:

The present disclosure provides embodiments that may indicate the Partial BW feedback in the Sensing NDPA when the operating BW of each responder (station) is smaller than the BW of the EHT NDP PPDU.

The Partial BW FB is a STA specific parameter which may be indicated in the STA Info fields of the Sensing NDPA. However, the Partial BW FB requires at least 8 bits to indicate the same Partial BW Feedback as the Partial BW Feedback in the EHT NDPA frame. The resolution of the Partial BW FB for the NDPA/NDP BW of 160 MHz and below is 20 MHz and the resolution of the Partial BW FB for the NDPA/NDP BW 320 MHz is 40 MHz. When the Ranging based NDPA is the baseline NDPA for the Sensing, then, there is not enough space to indicate the Partial BW FB in a STA Info field. Consequently, Sensing NDPAs based on the Ranging NDPA may not be used to communicate partial BW FB.

The BW of an NDPA/NDP frame may be aligned with the minimum operating BW of the STAs listed in the STA Info fields of the NDPA frame. That is, for example, if there are 4 STAs listed in the STA Info fields, and the operating BWs of each STA in the STA info fields are 40 MHz, 80 MHz, 160 MHz and 320 MHz, then the minimum operating BW would be 40 MHz. The drawback of doing this is that STAs with wider operating BW operate at reduced capability in order to match the inferior capability of other STAs.

Each responder (a responder Wi-Fi device, e.g., a STA) may report the measurements for the entire BW of the NDPA/NDP, excluding the punctured channels, when the preamble puncturing is supported (allowed). When partial BW is not supported, all the STAs listed in the STA Info fields measure the CSI with the same BW, which is the entire BW of the NDPA/NDP. The preamble puncturing inside this entire BW does not change the BW of the measurement.

Does the BW of the NDPA frame need to be explicitly indicated:

Presently, when a non-HT PPDU is used for the Sensing NDPA frame, the BW of the NDPA may be indicated in the Service field, or the responder (e.g., a STA) may implicitly detect the BW of the Sensing NDPA until the responder receives the NDP.

The present disclosure includes embodiments that introduce a BW subfield (the BW of the Sensing NDPA is supposed to be aligned with the BW of NDP) in a Special (Common) STA Info Field (which requires a new AID11 subfield) or in a STA Info Field. Once an additional Common Info Field is introduced according to the principle described in the present disclosure, it may be possible to utilize the available space in this Common Info Field to indicate the BW of an NDPA frame explicitly.

When an additional Common Info Field, with an AID11 subfield comprised between 2008 and 2042, is included in a sensing NDPA frame in order to indicate the preamble puncturing patterns (e.g., see Common Info Field 22 in FIG. 4), then, in accordance with the present disclosure, in some embodiments, the BW may be indicated in the same additional Common Info Field. As an example, referring back to the embodiment of FIG. 4, the Common Info Field 22 added to include preamble puncturing patterns may also include info specifying the BW. This may be possible when the preamble puncturing patterns require at most 5 bits and the additional Common Info Field has more than 5 bits, such as, for example a Common Info Field that has 32 bits (4 bytes). In other embodiments, a further Common Info Field may be added to the NDPA frame to indicate only the BW. Embodiments of the additional/further Common Info Field may have the same number of bits at the Common Info Field or may have a different number of bits.

Setting the SIG field in the EHT NDP PPDU for any number of LTF repetitions:

In the prior art, in the EHT Common Field of the EHT-SIG field, there are 3 bits assigned to indicate the number of EHT LTFs. The EHT Common Field may only allow twice as many LTFs as the number of transmission (TX) Spatial Streams (SSs), that is, for 1, 2, and 4 TX SSs, it is only allowed to use 2, 4, and 8 LTFs for the channel estimation improvement, while the usual number of LTFs should be aligned with the number of TX SSs.

In an embodiment of the present disclosure, the maximum number of LTFs may be set to integer multiples of the TX SSs with 8 LTFs being the maximum. For example, for 1 TX SS, 1, 2, 4, 6 and 8 LTFs may be allowed and for 2 TX SSs, 2, 4, 6 and 8 LTFs may be allowed. In an embodiment of the present disclosure, the arbitrary repetition of LTFs may be indicated in the NDPA in advance, before the NDP with which the repeated LTFs will be transmitted. The R2I Rep/I2R Rep subfields (in each STA Info Field) can be repurposed for the EHT NDP PPDU case to indicate the arbitrarily repeated LTFs.

Figure 6:
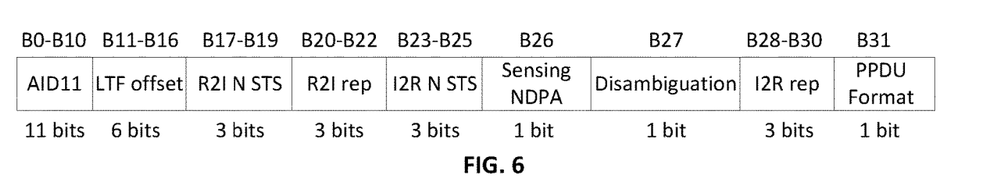
FIG. 6 shows an embodiment according to the present disclosure where B31 in the STA Info field in the Sensing NDPA is used to indicate the PPDU format of the following NDP.

In order to repurpose the R2I Rep/I2R Rep subfields, there is a need to indicate in the NDPA frame whether the following NDP is EHT-based or Ranging NDP-based. FIG. 6 shows an embodiment according to the present disclosure where B31 in the STA Info field in the Sensing NDPA is used to indicate the PPDU format of the following NDP. In the embodiment shown in FIG. 6, B26 may be used to indicate a Sensing NDPA.

Referring back to FIG. 5, according to the present disclosure, FIG. 5 shows an embodiment of a sensing NDPA frame where B26 is used to indicate the frame is a sensing NDPA frame and B31 is used to indicate whether the following NDP is EHT-based or Ranging NDP-based.

Figure 7:
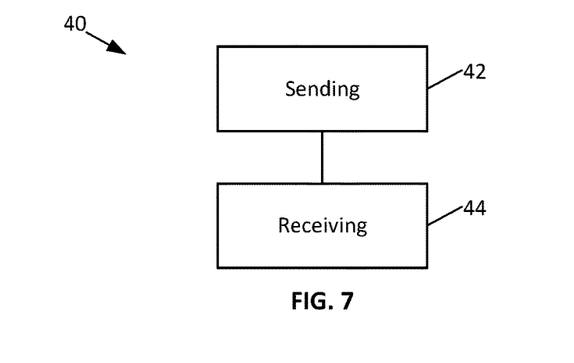
FIG. 7 shows a flowchart of an embodiment of a method in accordance with the present disclosure.

FIG. 7 shows a flowchart 40 of an embodiment of a method in accordance with the present disclosure. The method of flowchart 40 includes, at action 42, an initiator Wi-Fi device (e.g., an AP) sending to one or more responder Wi-Fi devices (RWFDs) a request for CSI, with the request comprising a sensing NDPA frame. The sensing NDPA frame may include one or more RWFD information fields each associated with a respective RWFD of the one or more RWFDs. The sensing NDPA frame may further included a first common information field (CIF) comprising first information segments defining first information common to the one or more RWFDs. The first CIF may have an AID11 value of 2045 and may be four octets in length. The sensing NDPA frame may include a second CIF comprising second information segments defining second information common to the one or more RWFDs. The second information segments may include 8 bits that may define a sub-channel puncturing pattern. At action 44, the initiator Wi-Fi device may receive from one or more than one of the RWFDs, a response to the request for the CSI. The response may be an ACK message.

Figure 8:
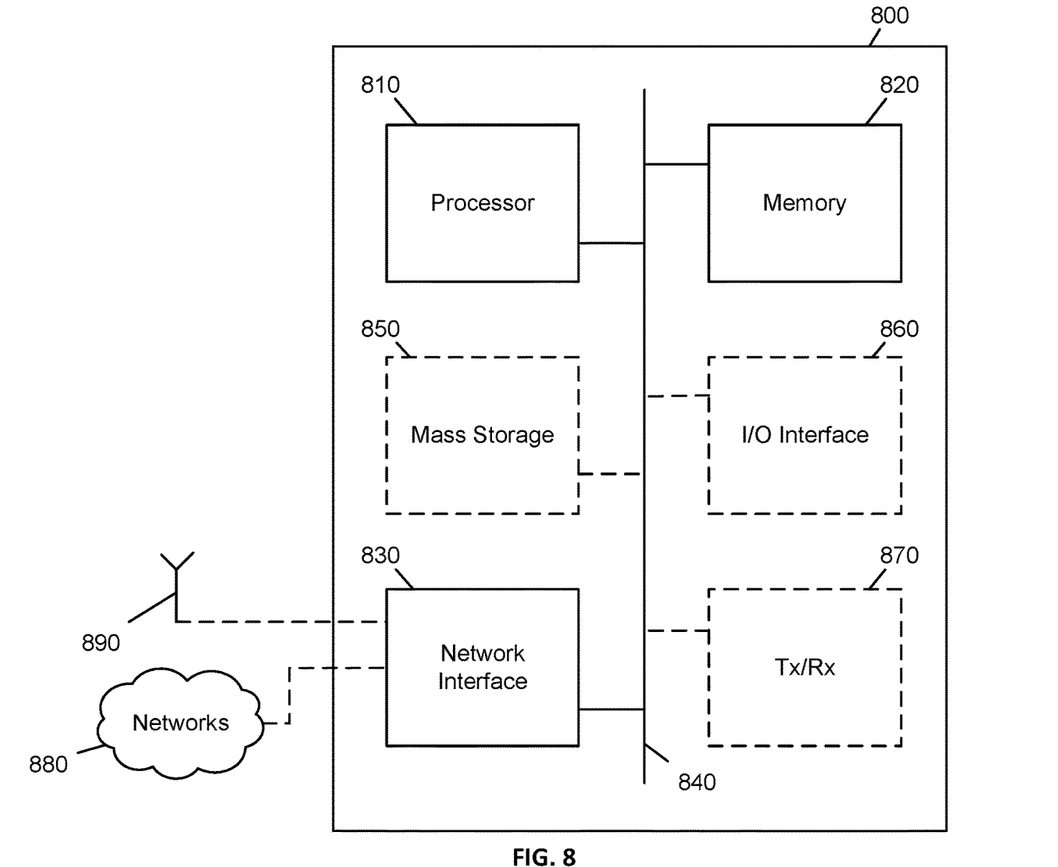
FIG. 8 shows a block diagram of an embodiment of an initiator Wi-Fi device according to the present disclosure.

FIG. 8 shows a schematic diagram of an embodiment of an initiator Wi-Fi device 800 according to the present disclosure. The initiator Wi-Fi device 800 may perform any or all of operations of the above methods and features explicitly or implicitly described herein, according to different embodiments of the present disclosure. For example, a computer equipped with network functions may be configured as the initiator Wi-Fi device 800.

The initiator Wi-Fi device 800 may include a processor 810, such as a Central Processing Unit (CPU) or specialized processors such as a Graphics Processing Unit (GPU) or other such processor unit, a memory 820, a non-transitory mass storage 850, an input-output interface 860, a network interface 830, and a transceiver 870, all of which are communicatively coupled via bi-directional bus 840. According to certain embodiments, any or all of the depicted elements may be utilized, or only a subset of the elements may be utilized. Further, the initiator Wi-Fi device 800 may contain multiple instances of certain elements, such as multiple processors, memories, or transceivers. Also, elements of the initiator Wi-Fi device 800 may be directly coupled to other elements without the bi-directional bus. Additionally, or alternatively to a processor and memory, other electronics, such as integrated circuits, may be employed for performing the required logical operations.

The memory 820 may include any type of non-transitory memory such as static random access memory (SRAM), dynamic random access memory (DRAM), synchronous DRAM (SDRAM), read-only memory (ROM), any combination of such, or the like. The mass storage element 850 may include any type of non-transitory storage device, such as a solid state drive, hard disk drive, a magnetic disk drive, an optical disk drive, USB drive, or any computer program product configured to store data and machine executable program code. According to certain embodiments, the memory 820 or mass storage 850 may have recorded thereon statements and instructions executable by the processor 810 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Actions associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Actions associated with the methods described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method, comprising:
  sending, by an initiator Wi-Fi device to one or more responder Wi-Fi devices (RWFDs), a request for channel state information (CSI), the request comprising a sensing null data packet announcement (NDPA) frame, the sensing NDPA frame having:
    one or more RWFD fields each associated with a respective RWFD of the one or more RWFDs;
    a first common information field (CIF) comprising first information segments defining first information common to the one or more RWFDs, the first CIF having an AID11 value of 2045, the first CIF having four octets; and
    a second CIF comprising second information segments defining second information common to the one or more RWFDs, the second information segments having 8 bits to define a sub-channel puncturing pattern; and receiving, by the initiator Wi-Fi device, at least one response to the request for CSI.

2. The method of claim 1, further comprising, by the initiator Wi-Fi device:
determining that partial bandwidth feedback from the one or more RWFDs is allowed; and
defining, in the second CIF, with the 8 bits, the sub-channel puncturing pattern.

3. The method of claim 1, further comprising, by the initiator Wi-Fi device:
determining that partial bandwidth feedback is disallowed; and
defining, in the second CIF, the sub-channel puncture pattern using at most 5 bits of the 8 bits.

4. The method of claim 1, wherein each of the one or more RWFD field has a respective AID11 value comprised between 1 and 2007.

5. The method of claim 1, wherein the second CIF has an AID11 value comprised between 2008 and 2042.

6. The method of claim 1, wherein the second CID has four octets.

7. The method of claim 1, wherein the initiator Wi-Fi device is a Wi-Fi access point.

8. The method of claim 1, wherein the one or more RWFDs are Wi-Fi stations.

9. A method, comprising:
sending, by an initiator Wi-Fi device to one or more responder Wi-Fi devices (RWFDs), a request for channel state information, the request comprising a sensing null data packet announcement (NDPA) frame, the sensing NDPA frame having:
one or more RWFD fields each associated with a respective RWFD of the one or more RWFDs, each of the one or more RWFDs comprising a respective 6-bit segment defining a sub-channel puncturing pattern; and
a common information field (CIF) comprising information segments defining information common to the one or more RWFDs, the CIF having a respective AID11 value of 2045.

10. The method of claim 9, further comprising, by the initiator Wi-Fi device, forming the sensing NDPA frame.

11. The method of claim 9 further comprising, by the initiator Wi-Fi device:
determining that partial bandwidth feedback is allowed; and
for a sub-channel puncturing pattern that requires 6 bits or less, indicating the sub-channel puncturing pattern in the 6-bit segment of each RFWD field of the one or more RWFD fields.

12. The method of claim 9 further comprising, by the initiator Wi-Fi device:
determining that partial bandwidth feedback is disallowed; and
when the sub-channel puncturing patterns requires at most 5 bits, indicating the sub-channel puncturing patterns in the 6-bit segment of each RFWF field of the one or more RWFD fields.

13. The method of claim 9, wherein each RWFD field of the one or more RWFD fields further comprises a 1-bit field, B26, to indicate the NDPA frame is a sensing NDPA frame.

14. The method of claim 9, wherein each RWFD field of the one or more RWFD fields further comprises a 1-bit field, B31, to indicate a type of NDP PPDU to follow.

15. The method of claim 14, wherein the type of the NDP PPDU to follow is an extremely high throughput (EHT) EHT NDP PPDU type or a ranging NDP type.

16. The method of claim 9, wherein:
the NDPA frame indicated that partial bandwidth is allowed or disallowed; and
each RWFD field of the one or more RWFD fields comprises:
an 11-bit field, B0 to B10, defining a respective AID11 value comprised between 1 and 2007; and
a 6-bit field, B11 to B16, associated to a sub-channel puncturing pattern.

17. The method of claim 1, wherein each RWFD of the one or more RWFDs has a respective operating bandwidth, the method further comprising:
determining a lowest operating bandwidth of the respective bandwidths of the one or more RWFDs; and
setting a bandwidth of the sensing NDPA frame to the lowest operating bandwidth of the respective bandwidths of the one or more RWFDs.

18. The method of claim 9, wherein each RWFD of the one or more RWFDs has a respective operating bandwidth, the method further comprising:
determining a lowest operating bandwidth of the respective bandwidths of the one or more RWFDs; and
setting a bandwidth of the sensing NDPA frame to the lowest operating bandwidth of the respective bandwidths of the one or more RWFDs.

19. A method, comprising:
sending, by an initiator Wi-Fi device to one or more responder Wi-Fi devices (RWFDs), a request for channel state information, the request comprising a sensing null data packet announcement (NDPA) frame, the sensing NDPA frame having:
one or more RWFD fields each associated with a respective RWFD of the one or more RWFDs;
a first common information field (CIF) comprising first information segments defining information common to the one or more RWFDs, the first CIF having a respective AID11 value of 2045, the CIF having four octets; and
a second CIF comprising second information segments defining a bandwidth of the sensing NDPA frame.

20. A method, comprising:
sending, by an initiator Wi-Fi device to one or more responder Wi-Fi devices (RWFDs), a request for channel state information, the request comprising a sensing null data packet announcement (NDPA) frame, the sensing NDPA frame having one or more RWFD fields each associated with a respective RWFD of the one or more RWFDs, each RWFD field of the one or more RWFD fields having a one-bit field, B31, indicating a type of NDP PPDU to follow, the NDP PPDU type to follow being a ranging NDP PPDU type or an EHT NDP PPDU type; and
when the type of NDP PPDU to follow is of the EHT NDP PPDU type, indicating, at B20 to B25, a number of repetitions of a long training field.

21. The method of claim 20, wherein the number of repetitions of the long training field is, at most, eight repetitions.

22. A method, comprising:
receiving, by an individual responder Wi-Fi device (RWFD), the individual RWFW being one a plurality of RWFDs, from an initiator Wi-Fi device, a request for channel state information, the request comprising a sensing null data packet announcement (NDPA) frame, the sensing NDPA frame having:
one or more RWFD fields each associated with a respective RWFD of the plurality of RWFDs;

a first common information field (CIF) comprising first information segments defining first information common to the plurality of RWFDs, the first CIF having an AID11 value of 2045, the first CIF having four octets; and a second CIF comprising second information segments defining second information common to the one or more RWFDs, the second information segments having 8 bits to define a sub-channel puncturing pattern; and sending, by the individual RWFD, to the initiator Wi-Fi device, a response to the request.

23. A method, comprising:

sending, by an initiator Wi-Fi device to one or more responder Wi-Fi devices (RWFDs), a request for channel state information (CSI), the request comprising a sensing null data packet announcement (NDPA) frame, the sensing NDPA frame having:

one or more RWFD fields each associated with a respective RWFD of the one or more RWFDs, each RWFD field of the one or more RWFD fields comprising:

an 11-bit field, B0 to B10, defining a respective AID11 value comprised between 1 and 2007;

a first 3-bit field, B20 to B22;

a second 3-bit field, B28 to B30, the first 3-bit field and the second 3-bit field being set to indicate, a number of repetitions allowed for a long training field (LTF) of an EHT NDP PPDU to follow; and a 6-bit field, B11 to B16, associated to a sub-channel puncturing pattern; and a first common information field (CIF) comprising first information fields defining information common to the one or more RFWDs, the first CIF having an AID11 value of 2045.

24. A method of indicating a channel state information (CSI) measurement in a Sensing Null Data Packet Announcement (NDPA) frame for a preamble punctured EHT NDP PPDU, the sensing NDPA frame having a ranging NDPA format, the method comprising:

including, in the Sensing NDPA frame, a first special station (STA) Info field having an association identification (AID11) of 2045;

including, in the Sensing NDPA frame, a second special STA Info field having an AID11 of between 2008 and 2042, the second special STA Info field having 32 bits in length;

when partial bandwidth PBW is allowed, indicating the possible puncturing patterns using the at least eight bits of the STA Info field; and when PBW is not allowed, indicating the possible puncturing patterns using at most five bits of the second special STA Info field.

25. A method of indicating a channel state information (CSI) measurement in a Sensing Null Data Packet Announcement (NDPA) frame for a preamble punctured EHT NDP PPDU, the sensing NDPA frame having a ranging NDPA format, the method comprising:

including, in the Sensing NDPA frame, a first special station (STA) field having an association identification (AID11) of 2045;

including, in the Sensing NDPA frame, N STA info fields, N being an integer corresponding to a number of STAs;

when PBW is not allowed, including, in each of the N STA info fields, at B11 to B16, the possible puncture patterns;

when partial bandwidth PBW is allowed and when the puncture pattern requires six bits or less, indicating, in each of the N STA info fields, the puncture pattern at B11 to B16.

26. The method of claim 25, wherein each of the N STA info fields includes a Long Training Field (LTF) Offset sub-field at B11 to B16, the method further comprising re-purposing the LTF Offset sub-field to indicate the possible puncturing patterns.

27. A method of indicating a channel state information (CSI) measurement in a Sensing Null Data Packet Announcement (NDPA) frame for a preamble punctured non-high throughput (non-HT) non-HT PPDU, the sensing NDPA frame having a ranging NDPA format, the method comprising:

including, in the Sensing NDPA frame, a first special station (STA) Info field having an association identification (AID 11) of 2045; and including, in the Sensing NDPA frame, a second special STA Info field having an AID 11 of between 2008 and 2042, the second special STA Info field having 32 bits in length.

* * * * *